A. L. HANSEN.
SPARK WHEEL TOOTHING MACHINE.
APPLICATION FILED AUG. 10, 1918.
1,344,299.
Patented June 22, 1920.
3 SHEETS—SHEET 2.
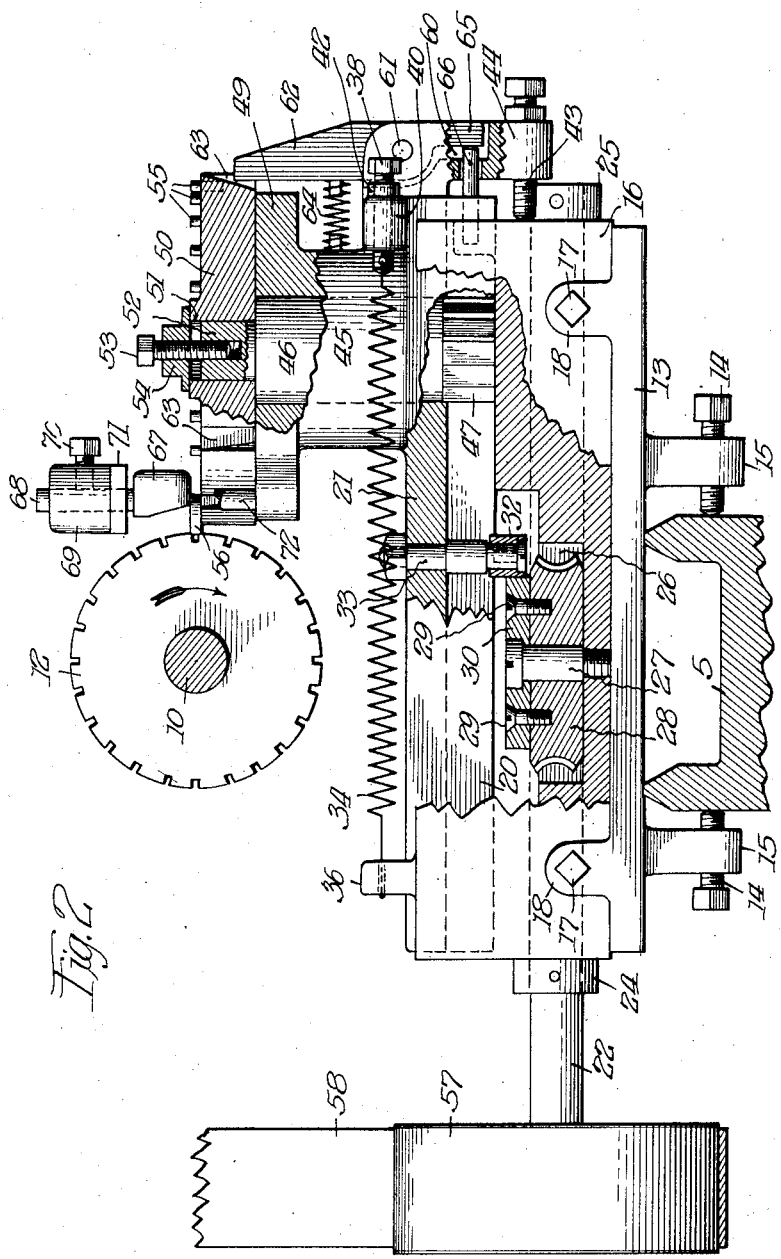

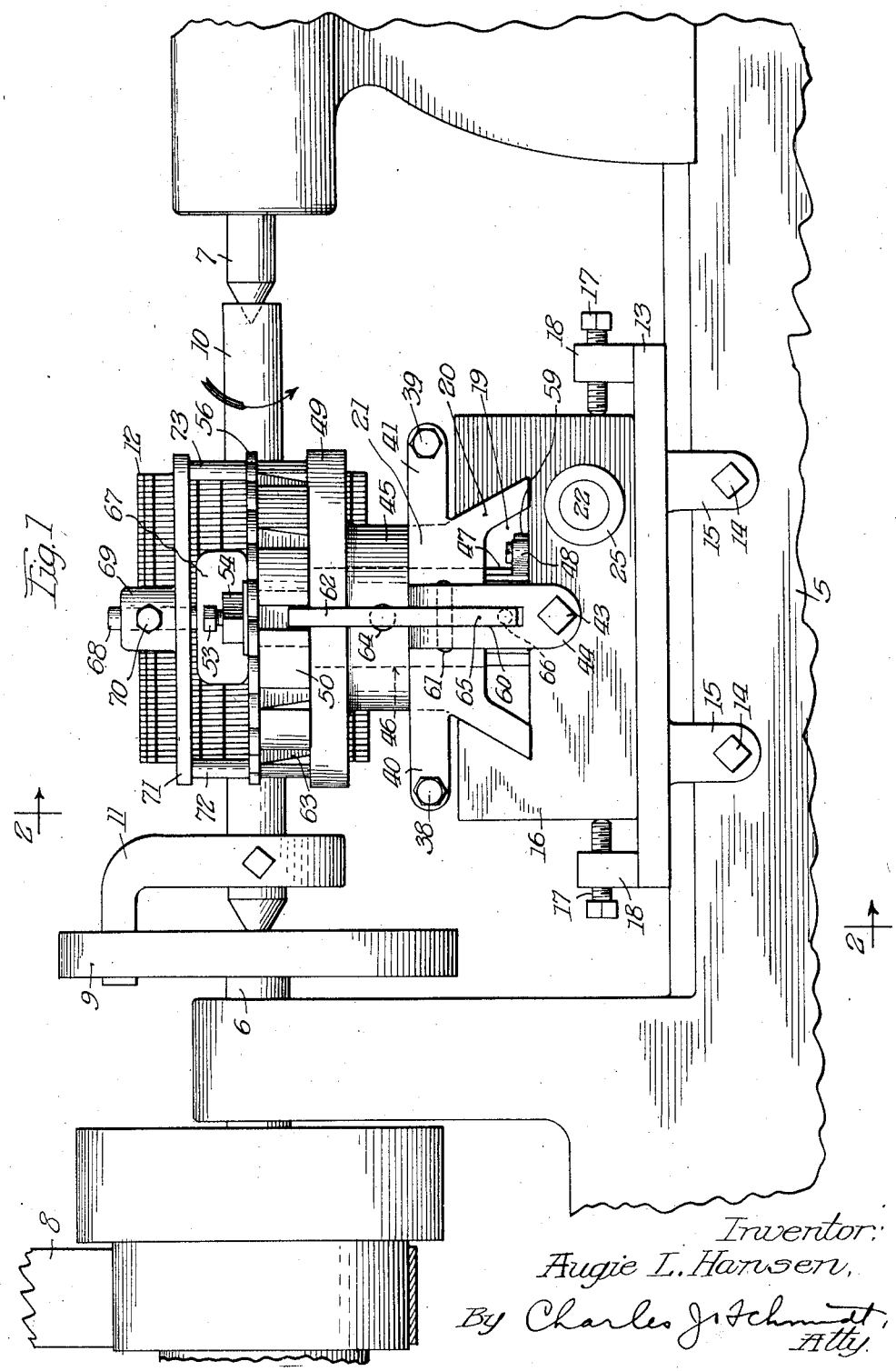

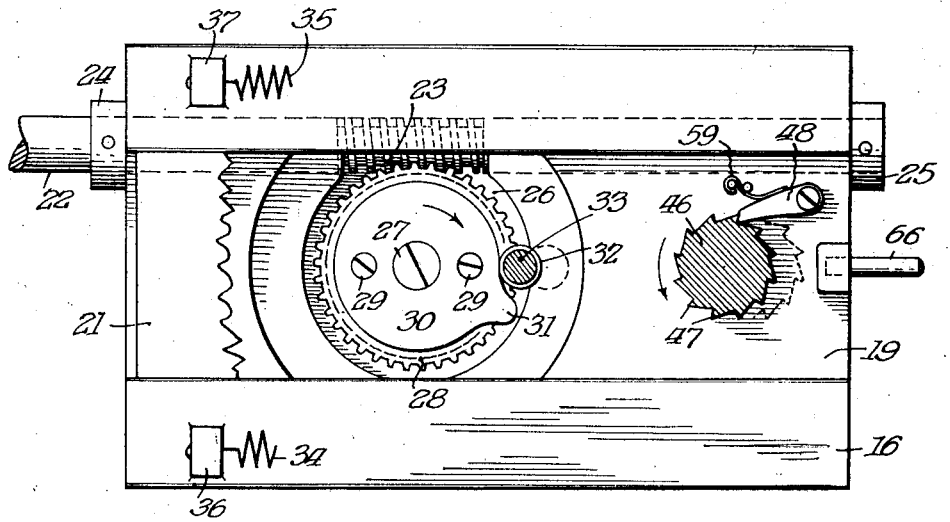
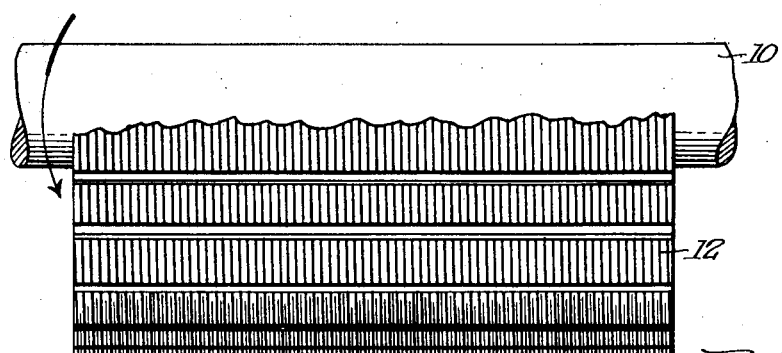
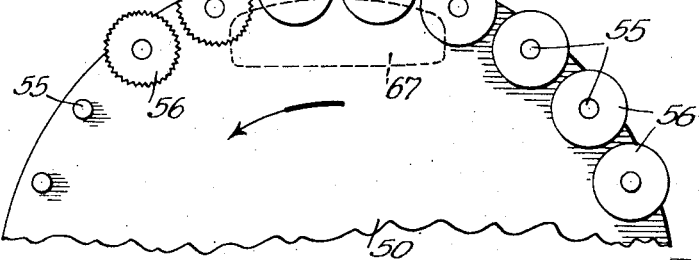

UNITED STATES PATENT OFFICE.

AUGIE L. HANSEN, OF EVANSTON, ILLINOIS, ASSIGNOR TO JUSTRITE MANUFACTURING COMPANY, OF CHICAGO, ILLINOIS, A CORPORATION OF ILLINOIS.

SPARK-WHEEL-TOOTHING MACHINE.

1,344,299.         Specification of Letters Patent.     Patented June 22, 1920.

Application filed August 10, 1918. Serial No. 249,218.

*To all whom it may concern:*

Be it known that I, AUGIE L. HANSEN, a citizen of the United States, and a resident of Evanston, in the county of Cook and State of Illinois, have invented certain new and useful Improvements in Spark-Wheel-Toothing Machines, of which the following is a specification.

My invention relates to an improved machine for forming teeth on pyrophoric spark wheels.

Pyrophoric spark wheels are used in great quantities in connection with gas tips, and particularly on cigar lighters and miners' acetylene lamps. A number of ways have been devised for forming the teeth or serrations on these wheels but these prior ways are more or less laborious and costly. The object of my invention is therefore to provide improved means for rapidly, inexpensively and efficiently toothing or serrating wheels of this class. In accordance with my invention I produce the teeth or serrations much in the same manner as the teeth are cut on worm gears, improved means being provided for automatically feeding wheels to a cutter and removing them from the cutting field after cutting operations.

Apparatus adapted to carry out the various features of my invention is illustrated on the accompanying drawings, in which—

Figure 1 is a front elevational view,

Fig. 2 is a side elevational view from plane 2—2, Fig. 1, with parts of the apparatus cut away to more clearly show the construction and arrangement, Fig. 3 is a plan view of the supporting block for the work holder carrier, and Fig. 4 is an enlarged plan view of part of the cutting hob and part of the work holding disk.

Referring to Fig. 1, 5 represents a lathe frame mounting the main shaft 6 and the tail stock spindle 7, the shaft 6 being shown as driven by a belt 8 connected with the counter shaft (not shown). Between the disk 9 and the spindle 7 the arbor 10 is pivoted and connected by means of the dog 11 to be rotated. On the arbor 10 is mounted the cutting hob 12.

The attachment for effecting coöperation of spark wheels with the cutting hob comprises a rectangular base 13 extending transversely on the lathe bed and held in place thereon by set screws 14 threading through lugs 15 and engaging with the front and rear sides of the lathe bed. On the base 13 a block 16 is securely held in adjusted position by set screws 17 threading through upstanding lugs 18 on the base 13. Extending longitudinally at the top of the block 16 is the dove-tail slot 19 in which engages the dove-tail extension 20 on the plate 21, this plate being reciprocable on the block 16 at right angles with reference to the arbor 10. A shaft 22 extends longitudinally through the block 16 below the slot 19 and has worm threads 23 cut thereon, the shaft being held against longitudinal displacement by collars 24 and 25. The threaded section of the shaft extends through the side of a pit 26 formed in the block 16, centrally of which pit a pivot stud 27 extends upwardly and forms a bearing for the worm wheel 28 which meshes with the worm threads. Secured concentrically on top of the worm wheel as by screws 29 is the cylindrical cam disk 30 which, as shown, has one cam tooth 31 extending from its cylindrical cam surface. The cam tooth coöperates with the cam roller 32 at the lower end of the cam stud 33 extending downwardly from the plate 21. Springs 34 and 35 extend between the studs 36 and 37 on top of block 16 and the inner ends of adjusting screws 38 and 39 which extend through the ends of arms 40 and 41 at the front end of the plate 21. The adjusting screws are held in adjusted position by lock nuts 42. The springs tend to hold the plate 21 inwardly with the cam roller 32 in the path of the cam tooth 31 so that when this tooth coöperates with the roller the plate 21 will be shifted outwardly. A set screw 43 threading through the lower end of the bracket 44 extending downwardly at the front of the plate 21 serves, by abutting against the block 16, to limit the inward movement of the plate 21.

Extending upwardly from the top of the plate 21 at the front end thereof is the bearing standard 45 for the vertical shaft 46, this shaft having at its lower end the ratchet teeth 47 with which coöperates the pawl 48 pivoted on the block 16 at the front end of the slot 19. The standard 45 is expanded at its upper end to form a supporting table 49 for the work holding disk 50, this disk having the central passageway 51 receiving the reduced neck 52 on the shaft 50, the disk being secured to the shaft by means of a screw 53 threading into the neck and a nut 54 threading on the screw against the top of the disk 50.

Near the periphery of the work supporting disk pins 55 extend upwardly for receiving the circular wheel blanks 56, the pins being equidistant from the center of the disk and equally spaced apart.

On the worm shaft 22 is the pulley 57 connected by belt 58 preferably with the same counter shaft that the lathe belt 8 connects with so that there will always be a fixed rotation ratio between the shafts 6 and 22. The gearing ratio between the worm 23 and the worm wheel 28 is such that for a fixed number of revolutions of the lathe shaft and the cutting hob 12 the worm wheel will make one revolution and the plate 21 will be given one outward shift by coöperation of the cam tooth with the cam roller. When the plate 21 is in the pawl 48 is held by its spring 59 against one of the teeth 47 at the lower end of the work holding disk shaft 46, and during outward shift of the plate 21 the shaft 46 and the work holding disk will be rotated, the distance of outward shift being such as to cause a rotation of the work holding disk an arcuate distance equal to two pin spaces. Pivoted in the vertical notch 60 in bracket 44 on pin 61 is the detent pawl 62 whose upper end coöperates with notches 63 cut in the edge of the work holding disk 50. A compression spring 64 interposed between the standard 45 and the upper part of the pawl tends to swing the upper end of the pawl out of the notches and does so when the plate 21 is shifted outwardly and the tail 65 of the pawl is carried away from the abutment pin 66 extending from the block 16. When the plate 21 is in the pin and tail are in engagement and the pawl is held against the force of spring 64 with its upper end in one of the notches 63, while when the plate 21 is shifted out and the tail 65 released from the pin 66, the spring 64 will swing the pawl away from the notches and release the disk 50 so that it may be rotated by the coöperation of the teeth 47 with the pawl 48. When the plate 21 is in and the disk 50 locked by the pawl 62 two spark wheel blanks will be held against the cutting hob by force of the springs 34 and 35 and when the plate 21 is shifted outwardly the disk 50 will be rotated a sufficient distance to bring the next two wheel blanks into position to engage with the cutting hob when the disk 21 is re-shifted inwardly, the work holding disk 50 being rotated in the direction indicated by the arrow in Fig. 4.

The springs 34 and 35 cause each set of wheel blanks to be yieldingly pressed against the rotating cutting hob 12 and as the hob cuts into the wheels teeth are formed which coöperate with the hob threads to cause rotation of the blanks, the hob acting like a driving worm and the wheels like driven worm wheels. The first cuts on the blanks are shallow but the springs 34 and 35 soon force the blank edges full distance into the cutting threads and then the engaged blanks are turned on their supporting pins by the hob until the first cuts have been given the proper depth and full sized teeth are formed entirely around the blanks. At this point the cam tooth 31 will come into coöperation with the cam roller and the plate 21 with the blank supporting disk 50 will be shifted outwardly, rotated, and returned to bring the next set of blanks against the hob. In order to hold the blanks firmly against the supporting disk 50 and to prevent tilting thereof during the cutting operation a holding block 67 is provided over the disk 50 for engaging with the blanks inside of the blank supporting pins. This block is secured at the lower end of the vertical stem 68 held in the lug 69 by set screw 70; the lug being on the cross bar 71 supported on pins 72 and 73 extending upwardly from the table 49. The ends of the block 67 are rounded so that the blanks can readily pass thereunder to be then held flat against the disk 50 during the cutting operation. The operator at the front of the machine places wheel blanks on the pins 55 and removes the finished wheels from the pins, and the speed of the machine is controlled only by the speed at which the operator can feed the blanks to the pins. After cutting the wheels are tempered and are ready for use.

I thus produce very simple and efficient mechanism for rapidly and inexpensively serrating spark wheel blanks.

I do not, of course, desire to be limited to the exact construction and arrangement shown and described and changes and modifications are no doubt possible which would still come within the scope of the invention as defined by the appended claims.

I claim as follows:

1. In a machine for serrating pyrophoric spark wheel blanks, the combination of a shaft, a serrating tool mounted thereon, a block secured below said shaft and extending transversely thereof, a carrier slidable longitudinally on said block, a shaft journaled in said block, means for rotating said shafts, a worm on said block shaft, a worm wheel on said block engaged by said worm, a cam supported by said worm wheel, a cam stud extending from said carrier to be engaged by said cam, springs tending to hold said carrier in its inner position and said cam and stud coöperating to shift said carrier to its outer position, a vertical shaft journaled in said carrier, a work holder secured to the upper end of said vertical shaft to rotate in a horizontal plane in front of said tool, teeth at the lower end of said vertical shaft, a pawl on said block for cooperating with said teeth during outward shift of said carrier whereby to rotate said vertical shaft and said work holder, a row of vertical pins on said holder concentric with the holder axis for supporting blanks for axial rotation, means for locking said holder in position to present a blank to the tool when the carrier is shifted inwardly, and means for releasing said holder when the carrier is shifted outwardly to permit rotation of said holder to remove the cut blank and to bring another blank into position to be cut by the tool.

2. In a machine for serrating circular blanks, the combination of a shaft, a serrating tool mounted thereon, a block supported below said shaft, a carrier reciprocable on said block toward and away from said serrating tool, a vertical shaft journaled on said carrier, a work holder secured to the upper end of said shaft, pins on said work holder for supporting the blanks to be serrated, teeth on the lower end of said vertical shaft, and a pawl on said block for engaging with said teeth to rotate said vertical shaft during movement of said carrier away from said serrating tool, engagement of said pawl and teeth causing rotation of the work holder to bring another blank into the serrating field.

3. In a serrating machine, the combination of a shaft, a serrating tool on said shaft, a block secured below said shaft, a carrier mounted on said block, a shaft journaled in said block, a worm on said shaft, a worm wheel journaled on said block and meshing with said worm, a cam plate on said worm wheel, a cam roller supported on said carrier in the path of said cam plate, springs connecting between said carrier and block for yieldingly holding said cam roller against said plate, a work holder disk supported on said carrier, and means on said disk for supporting blanks to be serrated, said springs serving also to yieldingly press said blanks against the serrating tool.

4. In a serrating machine, the combination of an arbor, a serrating tool on said arbor, a block stationarily mounted below said arbor, a carrier reciprocable on said block toward and away from said serrating tool, cam members mounted respectively on said block and carrier for affecting reciprocation of said carrier, a work holder disk supported on said carrier, pins on said disk for receiving blanks to be serrated, and springs connecting between said carrier and block for yieldingly pressing blanks against the serrating tool and for yieldingly keeping the cam members in operative engagement.

In witness whereof, I hereunto subscribe my name this 6th day of August, A. D. 1918.

AUGIE L. HANSEN.